(12) United States Patent
Gurumohan et al.

(10) Patent No.: US 10,072,964 B2
(45) Date of Patent: Sep. 11, 2018

(54) CONTAINER FILL LEVEL MEASUREMENT AND MANAGEMENT

(71) Applicant: Nectar, Inc., Palo Alto, CA (US)

(72) Inventors: Prabhanjan C. Gurumohan, Mountain View, CA (US); Aayush Phumbhra, Palo Alto, CA (US)

(73) Assignee: Nectar, Inc., Palo Alto, CA (US)

( * ) Notice: Subject to any disclaimer, the term of this patent is extended or adjusted under 35 U.S.C. 154(b) by 21 days.

(21) Appl. No.: 14/627,719

(22) Filed: Feb. 20, 2015

(65) Prior Publication Data

US 2016/0178426 A1   Jun. 23, 2016

Related U.S. Application Data

(60) Provisional application No. 62/093,890, filed on Dec. 18, 2014.

(51) Int. Cl.
| | | |
|---|---|---|
| *G01F 23/296* | (2006.01) | |
| *A47G 19/00* | (2006.01) | |
| *G01S 7/521* | (2006.01) | |
| *G01S 15/88* | (2006.01) | |
| *G01F 23/00* | (2006.01) | |

(52) U.S. Cl.
CPC ......... *G01F 23/2962* (2013.01); *A47G 19/00* (2013.01); *G01S 7/521* (2013.01); *G01S 15/88* (2013.01); *G01F 23/0069* (2013.01)

(58) Field of Classification Search
None
See application file for complete search history.

(56) References Cited

U.S. PATENT DOCUMENTS

| | | | |
|---|---|---|---|
| 4,697,200 A | | 9/1987 | Miyatake |
| 4,698,541 A | | 10/1987 | Bar-Cohen |
| 4,782,451 A | | 11/1988 | Mazzarella |
| 4,823,600 A | * | 4/1989 | Biegel ................... G01M 3/243 |
| | | | 73/40.5 A |
| 4,934,191 A | | 6/1990 | Kroening |
| 4,961,456 A | * | 10/1990 | Stembridge ........... B06B 1/0681 |
| | | | 141/1 |
| 5,042,698 A | | 8/1991 | Fessell |
| 5,150,334 A | | 9/1992 | Crosby |
| 5,303,585 A | | 4/1994 | Lichte |
| 5,389,848 A | * | 2/1995 | Trzaskos ............... B06B 1/0611 |
| | | | 310/322 |

(Continued)

OTHER PUBLICATIONS

Amanda Macmillan. It's the Water Bottle of the Future-and You can Pre-Order It Now! Fitness(Flash/Fitness-Blog/) Oct. 7, 2013. http://www.self.com/flash/fitness-blog/2013/10/fitness-water-bottle-of-the-future/.

(Continued)

*Primary Examiner* — Manish S Shah
*Assistant Examiner* — Jean Morello
(74) *Attorney, Agent, or Firm* — Van Pelt, Yi & James LLP

(57) ABSTRACT

A content fill level sensor is disclosed. The sensor includes a transmitter located proximal to a portion of a container cover that is configured to engage an opening of a container. The sensor also includes a waveguide extending from the transmitter such that the waveguide includes a distal end that is configured to be located within an interior of the container when the container cover engages the container.

20 Claims, 13 Drawing Sheets

(56) References Cited

U.S. PATENT DOCUMENTS

| | | | |
|---|---|---|---|
| 5,471,872 A * | 12/1995 | Cummings | G01F 23/2962 |
| | | | 73/290 V |
| 5,603,430 A | 2/1997 | Loehrke | |
| 5,866,815 A * | 2/1999 | Schwald | G01F 23/2968 |
| | | | 73/290 V |
| 5,880,364 A | 3/1999 | Dam | |
| 6,272,921 B1 | 8/2001 | Ivanovich | |
| 6,545,946 B1 | 4/2003 | Huss | |
| 6,856,247 B1 | 2/2005 | Wallace | |
| 7,068,805 B2 * | 6/2006 | Geddes | H04R 1/345 |
| | | | 181/187 |
| 7,088,258 B2 | 8/2006 | Morrison | |
| 7,109,863 B2 | 9/2006 | Morrison | |
| 7,190,278 B2 | 3/2007 | Morrison | |
| 7,495,558 B2 | 2/2009 | Pope et al. | |
| 7,573,395 B2 | 8/2009 | Morrison | |
| 7,598,883 B2 | 10/2009 | Morrison | |
| 8,061,198 B2 | 11/2011 | Yinko et al. | |
| 8,151,596 B2 | 4/2012 | Richmond et al. | |
| 8,284,068 B2 | 10/2012 | Johnson | |
| 8,851,740 B1 | 10/2014 | Mills | |
| 9,506,798 B2 | 11/2016 | Saltzgiver | |
| 9,508,484 B2 | 11/2016 | Scholz | |
| 2002/0059828 A1 * | 5/2002 | Muller | G01F 23/284 |
| | | | 73/290 R |
| 2005/0033532 A1 | 2/2005 | Mogadam | |
| 2005/0072226 A1 | 4/2005 | Pappas | |
| 2005/0268715 A1 | 12/2005 | Sabatino | |
| 2006/0201245 A1 * | 9/2006 | Huber | G01F 23/003 |
| | | | 73/290 R |
| 2006/0231109 A1 | 10/2006 | Howell et al. | |
| 2006/0270421 A1 | 11/2006 | Phillips | |
| 2007/0008212 A1 | 1/2007 | Serban | |
| 2007/0125162 A1 * | 6/2007 | Ghazi | G01F 1/007 |
| | | | 73/149 |
| 2007/0261487 A1 * | 11/2007 | Sintes | G01F 23/2962 |
| | | | 73/290 V |
| 2008/0250869 A1 | 10/2008 | Breed | |
| 2008/0314807 A1 | 12/2008 | Junghanns | |
| 2009/0093983 A1 * | 4/2009 | Trafford | G01F 23/2962 |
| | | | 702/100 |
| 2009/0134183 A1 | 5/2009 | Odishoo | |
| 2010/0101317 A1 | 4/2010 | Ashrafzadeh | |
| 2010/0108635 A1 | 5/2010 | Horstman | |
| 2010/0200593 A1 | 8/2010 | Lazar et al. | |
| 2010/0270257 A1 | 10/2010 | Wachman et al. | |
| 2011/0042408 A1 | 2/2011 | Giordano | |
| 2011/0166699 A1 | 7/2011 | Palmquist | |
| 2011/0169635 A1 | 7/2011 | Johnson | |
| 2012/0052802 A1 | 3/2012 | Kasslin | |
| 2012/0206155 A1 | 8/2012 | Wang et al. | |
| 2013/0073218 A1 | 3/2013 | Haas | |
| 2013/0122817 A1 | 5/2013 | Pivaudran | |
| 2013/0222135 A1 | 8/2013 | Stein et al. | |
| 2014/0149265 A1 | 5/2014 | Kundra | |
| 2014/0208845 A1 | 7/2014 | Zlotnick | |
| 2014/0360270 A1 * | 12/2014 | Koenig | G01N 29/221 |
| | | | 73/597 |
| 2015/0101405 A1 * | 4/2015 | Gorenflo | G01F 23/0061 |
| | | | 73/290 V |
| 2015/0355012 A1 | 12/2015 | Gurumohan | |
| 2016/0025545 A1 | 1/2016 | Saltzgiver | |
| 2016/0146659 A1 * | 5/2016 | Saltzgiver | G01F 23/263 |
| | | | 206/459.1 |
| 2016/0178426 A1 | 6/2016 | Gurumohan | |
| 2016/0194190 A1 | 7/2016 | Fogg | |

OTHER PUBLICATIONS

Jonah Comstock. Slideshow: 8 Pillboxes that Connect to Your Phone. Mobihealth News. Mar. 13, 2013. http://mobihealthnews.com/20795/slideshow-8-pillboxes-that-connect-to-your-phone/2/.

* cited by examiner

CONTAINER FILL LEVEL MEASUREMENT AND MANAGEMENT

CROSS REFERENCE TO OTHER APPLICATIONS

This application claims priority to U.S. Provisional Patent Application No. 62/093,890 entitled CONTAINER FILL LEVEL MEASUREMENT AND MANAGEMENT filed Dec. 18, 2014 which is incorporated herein by reference for all purposes.

BACKGROUND OF THE INVENTION

Distances can be measured by determining the time it takes for a signal to bounce off an object located at the desired distance. For example, if the speed of the signal and the travel time of the signal are known, a distance traveled by the signal can be measured. However in certain environments, it may be difficult to obtain an accurate distance measurement. For example, a configuration of the environment may make it difficult to place an instrument that can accurately measure a desired distance.

BRIEF DESCRIPTION OF THE DRAWINGS

Various embodiments of the invention are disclosed in the following detailed description and the accompanying drawings.

DETAILED DESCRIPTION

Figure 1:
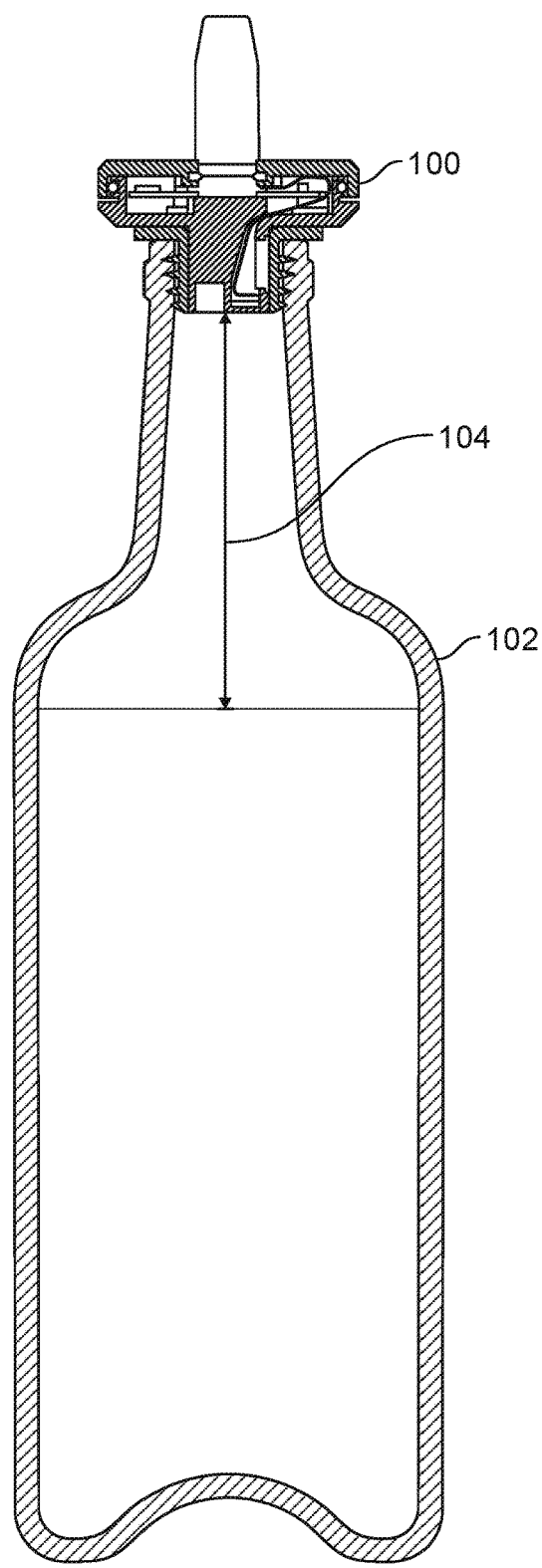
FIG. 1 is a diagram illustrating an embodiment of a fill level sensor engaged in a container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A fill level sensor is disclosed. For example, the fill level sensor measures the amount of liquid contained in a bottle. In some embodiments, the fill level sensor includes an acoustic transmitter located proximal to a portion of a container cover that is configured to engage a container opening. For example, the fill level sensor is included in a cap of a bottle and includes a speaker that will transmit a signal that will be utilized to measure a liquid fill level of the bottle. In some embodiments, the fill level sensor also includes a waveguide extending from the transmitter such that the waveguide includes a distal end that is configured to be located within the container interior when the container cover engages the container. For example, the waveguide guides a signal transmitted by the transmitter to a desired location and direction where the signal is directed towards contents filling a container. The signal may reflect off the container contents and arrive at a receiver of the fill level sensor that analyzes the received reflected signal to determine the fill level of the container.

FIG. 1 is a diagram illustrating an embodiment of a fill level sensor engaged in a container. Container 102 is filled with a liquid. In the example shown, fill level sensor 100 is configured as a bottle cap with a spout. The liquid fill level of container 102 may be determined by measuring the distance between sensor 100 and the liquid surface of container 102. As shown by line 104, a transmitter of sensor 100 sends out a signal (e.g., ultrasonic signal) that gets reflected by the surface of the liquid. The reflected signal is detected by a receiver of sensor 100.

By measuring the amount of time it took to receive the reflected signal, the distance traveled by the signal before being reflected (e.g., distance between sensor 100 and liquid surface is half of the total distance traveled by the signal) may be determined by multiplying the amount of time by the speed of the signal (e.g., speed of sound).

In some embodiments, to determine the amount of time it took to receive the reflected signal, the received reflected signal is filtered to isolate the desired signal (e.g., band-pass filter the received signal), amplified, and analyzed to detect peaks that correspond to when the reflected signal was received. In some embodiments, in order to achieve consistent and accurate measurements, gain at various depths is varied to help increase the received signal strength. Gain can be varied by changing the frequency and the number of pulses. For example, higher frequency and lower number of pulses may lead to better resolution at the top of the bottle/container while lower frequency and higher number of pulses may lead to better resolution towards the bottom of the bottle/container (e.g., the act of changing the pulses and frequency is akin to organ pipe tuning). Bottles and containers may have dead zones where no measurements can be obtained due to standing waves. By continuing to pulse or use large number of pulses at the same frequency, the dead zones may be overcome. A predetermined beginning portion (e.g., predetermined amount of time in the beginning of the signal) of the received signal may be ignored when analyzing the signal to ignore signals that were detected due to coupling between the transmitter and receiver of sensor 100. For example, when the transmitter transmits the signal, the signal may be received by the receiver of sensor 100 (e.g., conducted through sensor 100, due to undesired reflection, etc.) before the signal is reflected by the contents of the container, and the undesired received signals received in the beginning portion of the received signal are ignored when identifying the desired received reflected signal.

If the total distance between the bottom of container 102 and sensor 100 is known, the fill height of container 102 can be determined (e.g., total distance between bottom and sensor 100 minus distance between sensor 100 and liquid surface). If the shape and volume of the bottle are known, the volume of liquid contained in container 102 may be determined. For example, a table/database/data structure that maps fill level (e.g., fill height, height between liquid surface and sensor 100, etc.) to liquid volume of the container is utilized to determine liquid volume corresponding to the determined fill level. Different tables/databases/data structures may exist for different types of containers.

Sensor 100 includes a transmitter for transmitting the reflected signal and a receiver for receiving the reflected signal. However, due to the narrow opening of container 102, the placement of the transmitter and receiver in sensor 100 is limited to the narrow configuration of the bottle opening. If the transmitter and receiver are placed too close together, the transmitter and receiver may become coupled together. For example, the receiver may receive a strong signal from the transmitter as soon as the transmitter transmits a signal and the receiver may require a long settling time before the receiver is able to detect the desired reflected signal. If the distance between sensor 100 and the liquid surface is small, the desired reflected signal may be received before the receiver has settled and the receiver is unable to detect the desired reflected signal. In some embodiments, the transmitter and receiver of sensor 100 are vertically offset from each other to create a desired amount of separation distance between the transmitter and receiver. The separation distance may reduce the coupling of the transmitter and receiver and allow dampening of the transmitted signal propagated between the transmitter and the receiver through sensor 100. However, the vertical separation of the transmitter and the receiver may create undesired reflections within the container (e.g., reflections from the neck of a bottle) that make it difficult to identify the signal reflected from the liquid surface. In some embodiments, a waveguide extending from the transmitter is utilized to direct the signal transmitted by the transmitter towards the desired direction and location to minimize undesired effects.

Figure 2A:
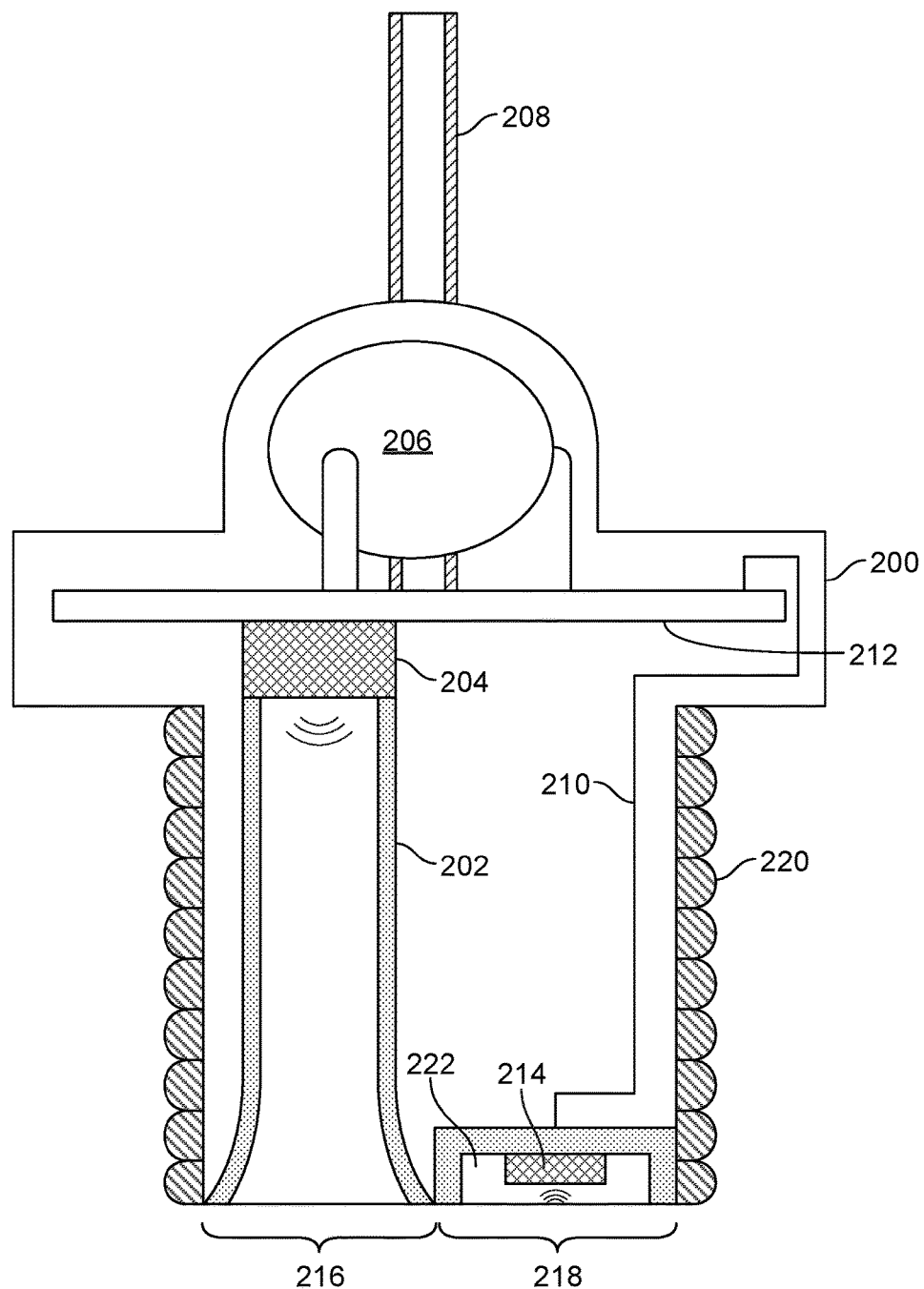
FIG. 2A is a vertical cross-sectional diagram illustrating an embodiment of a fill level sensor.
Figure 2B:
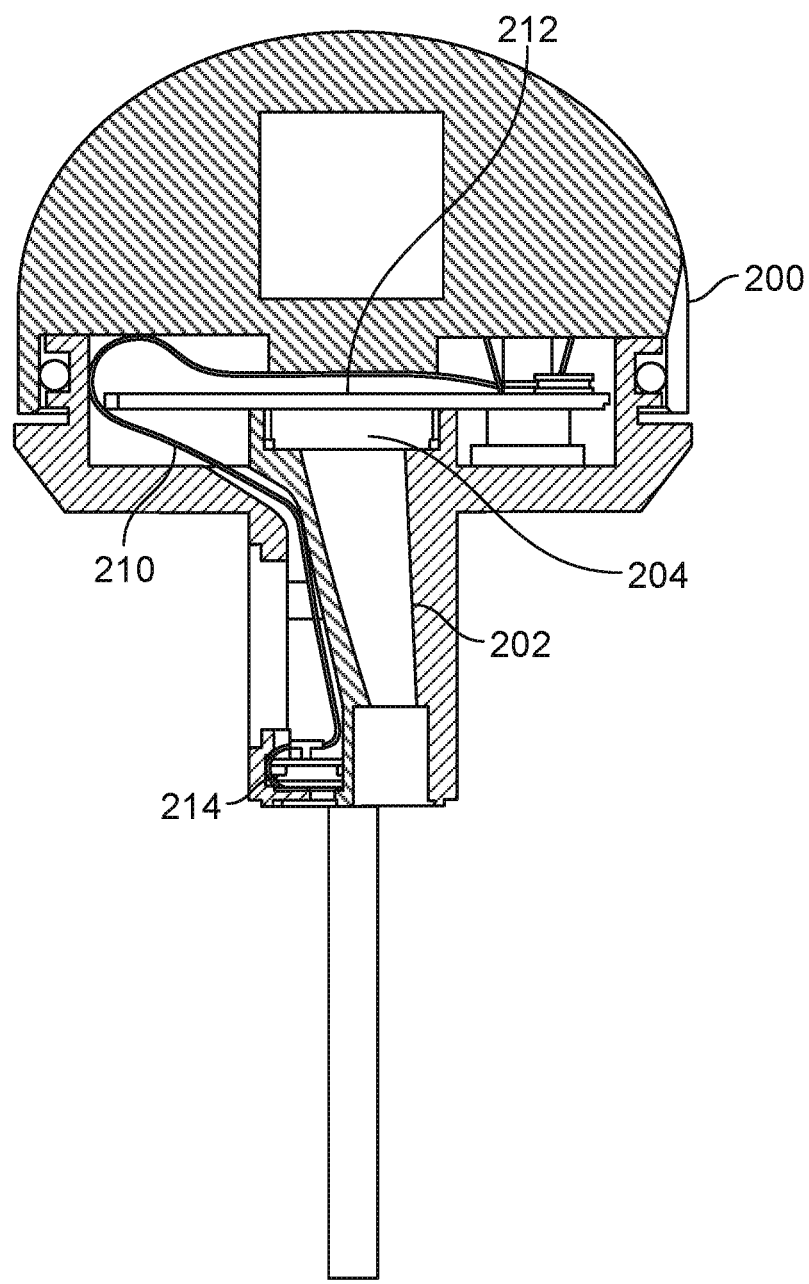
FIG. 2B is a vertical cross-sectional diagram illustrating an alternative embodiment of a fill level sensor.

FIG. 2A is a vertical cross-sectional diagram illustrating an embodiment of a fill level sensor. In some embodiments, sensor 200 is sensor 100 of FIG. 1. FIG. 2B is a vertical cross-sectional diagram illustrating an alternative embodiment of a fill level sensor. In the examples shown, sensor 200 is configured as a bottle stopper with a spout. As shown in FIG. 2A, sensor 200 includes flexible container coupling ridges 220 (e.g., rubber rings) that allows sensor 200 to be coupled to and seal an opening of a container (e.g., as shown in FIG. 1). However, in other embodiments, sensor 200 may be configured as a different cover of a container. For example, the components of sensor 200 may be included in a screw-on cap or any other cap that engages a container.

Sensor 200 includes circuit board 212. For example circuit board 212 is a printed circuit board. Circuit board 212 may connect together one or more of the following: a processor, a memory, a data storage, a connector, an integrated chip, a transmitter, a receiver, an accelerometer, a tilt sensor, a solar panel, a display, a gyroscope, a wireless data communication signal transmitter (e.g., a component able to communicate using Bluetooth (e.g., Bluetooth Low Energy), Wi-Fi, other wireless protocol, etc.), and other electrical components. For example, a processor connected to circuit board 212 provides a command to transmit an acoustic signal using a transmitter and processes a received signal to determine a fill level indicator. The fill level indicator may be transmitted wirelessly to another device such as a mobile device, a computer, a display device, or any other computing or display device using a wireless data communication transmitter. For example, when a change in depth is detected, a data packet is sent, and the data packet includes a device media access control (MAC) identifier, a depth value (e.g., in mm), an identifier of power left (e.g., in secs), and a real time clock value (e.g., 32 bit value). Circuit board 212 is connected to battery 206. Battery 206 provides power to the circuit of circuit board 212. Battery 206 may be rechargeable and/or replaceable. The housing of sensor 200 may be composed of one or more materials. Examples of the materials include a food grade polymer, plastic, rubber, stainless steel, and other metals.

Sensor 200 includes spout 208. Spout 208 is a part of a channel (e.g., tube) that allows container contents (e.g., liquid) to pass through to the tip opening of spout 208 from a bottom of sensor 200. For example, a liquid contained in a container that is capped by sensor 200 is able to pass through sensor 200 and exit the opening of spout 208 when the container capped by sensor 200 is tipped over. In some embodiments, circuit board 212 includes a hole that accommodates the channel (e.g., tube) that allows container contents (e.g., liquid) to pass through the circuit board. In other embodiments, spout 208 may not exist in sensor 200. In some embodiments, sensor 200 includes a vent pipe (not shown) that allows air to enter a container capped by sensor 200 as a content of the container is poured out through spout 208. In some embodiments, sensor 200 includes a motor (not shown) that pumps out contents of the container capped by sensor 200.

Circuit board 212 is connected to transmitter 204. In some embodiments, transmitter 204 is an acoustic transmitter (e.g., ultrasonic signal transmitter). For example, transmitter 204 is a speaker. In some embodiments, transmitter 204 is a piezoelectric speaker. In some embodiments, transmitter 204 is configured to transmit a signal within the ultrasonic frequencies. In some embodiments, transmitter 204 is configured to transmit a signal between 20 kHz and 400 kHz, inclusive. In some embodiments, transmitter 204 is configured to transmit a 29 kHz signal. In some embodiments, transmitter 204 is an acoustic impulse generator.

Receiver 214 is connected to circuit board 212 via connector 210. Examples of connector 210 include a wire, a bus, a flexible printed circuit board, and any other connector able to transmit a signal. In some embodiments, receiver 214 is an acoustic receiver (e.g., ultrasonic signal receiver). In some embodiments, receiver 214 is a microphone. In some embodiments, receiver 214 is a microelectromechanical systems (MEMS) microphone. For example, receiver 214 is 2 millimeter×3 millimeter in size.

Waveguide 202 extends from transmitter 204. For example, waveguide 202 includes a hollow chamber (e.g., tube) that guides and propagates an acoustic signal emitted by transmitter 204 from one end of the chamber to the other end of the chamber. For example, signal emitted by transmitter 204 enters waveguide 202 at the signal input end of the hollow chamber and exits out its output end of the hollow chamber (e.g., distal end). In some embodiments, waveguide 202 aids in directing an acoustic signal (e.g., ultrasonic signal, acoustic impulse) emitted by transmitter 204 towards the direction of the distance to be measured (e.g., towards bottom of sensor 200 that will be facing contents of a container capped by sensor 200).

In some embodiments, it is desirable to reduce and/or attempt to eliminate any signal reflections within the chamber of waveguide 202 as the signal is guided from one end to the other end of waveguide 202. For example, any undesired reflection may mask and hinder detection of the signal reflected by container contents desired to be detected. Any sudden change in the shape of the hollow chamber may create an impedance mismatch that creates a reflection within the hollow chamber of waveguide 202. In some embodiments, the interior wall of the hollow chamber of waveguide 202 is substantially smooth to prevent impedance mismatches. In some embodiments, a shape and/or size of a horizontal cross section of waveguide 202 does not change by more than one percent per millimeter of vertical distance between the signal input end closest to transmitter 204 to the other signal output end (e.g., distal end). In some embodiments, a shape of the opening of one end of the hollow chamber is different from a shape of the opening of the other end of the hollow chamber. For example, a shape of an opening of the transmitter may be different than a desired shape of the signal output end of waveguide 202 (e.g., desired shape to improve directionality of the signal in container). In one example, the signal input end of the chamber of waveguide 202 is shaped in a first shape (e.g., elliptical shape) and the output opening end of the other end of the chamber of waveguide 202 is shaped in a second shape (e.g., circular shape). The change in horizontal cross-sectional shape of the hollow signal propagation chamber may gradually morph from the first shape to the second shape across the vertical length of waveguide 202. For example, the minor axis of the elliptical shape signal input opening gradually is expanded (e.g., flair out smoothly) to generally match the major axis of the elliptical shape in the output end of waveguide 202.

In some embodiments, a cross-sectional area of a signal output opening of the chamber of waveguide 202 is at least as large as a cross-sectional area of a signal input opening of the other end of the chamber of waveguide 202 that receives the signal from transmitter 204. For example, the cross-sectional area of the signal output opening of waveguide 202 is substantially equal to the cross-sectional area of the signal input opening in one embodiment. In another example, the cross-sectional area of the signal output opening of waveguide 202 is greater than the cross-sectional area of the signal input opening.

In some embodiments, the horizontal cross-sectional area of the hollow chamber of waveguide 202 is only greater or equal to a previous horizontal cross-sectional area of the hollow chamber from the input opening to the output opening of waveguide 202. For example, in order to ensure that the amplitude of an acoustic signal outputted by transmitter 204 is maintained as much as possible, the cross-sectional area of the chamber of waveguide 202 never decreases as the acoustic signal is traveling down the chamber of waveguide 202. In some embodiments, the horizontal cross-sectional area of the chamber of waveguide 202 is generally increasing as the signal emitted by transmitter 204 travels down waveguide 202 towards the distal end of waveguide 202.

In some embodiments, the interior hollow chamber of waveguide 202 is coated with a dampening material. For example, an acoustic signal dampening material (e.g., rubber like material) coats plastic walls of the hollow chamber and the coating may assist in reducing the amount of signal that gets transferred to receiver 214 from the portion of the signal that impacts the walls of the hollow chamber. In some embodiments, an interior chamber of waveguide 200 is filled with an acoustically permeable material. In some embodiments, an open end of waveguide 202 is touching transmitter 204. For example, a rubberized end of waveguide 202 seals signals emitted by transmitter 204 within an air chamber of waveguide 202. In some embodiments, a size of a signal input opening of waveguide 202 near transmitter 204 is at least as large as a transmitter opening of transmitter 204. For example, transmitter 204 includes an opening where an acoustic signal is outputted (e.g., speaker grill opening) and the opening of the transmitter is positioned within the signal input opening of waveguide 202 that is at least as large. In some embodiments, a shape and size of a signal input opening of waveguide 202 near transmitter 204 is substantially the same as a transmitter opening of transmitter 204. In some embodiments, waveguide 202 is attached to transmitter 204. For example, transmitter 204 and waveguide 202 are attached together by glue. In some embodiments, waveguide 202 is mechanically coupled to transmitter 204.

In some embodiments, a height of waveguide 202 (e.g., distance between the input and output openings) is approximately 20 millimeters. In some embodiments, a height of waveguide 202 (e.g., distance between the input and output openings) is approximately less than or equal to 60 millimeters. In some embodiments, widths of a hollow chamber of waveguide 202 (e.g., horizontal cross-sectional area) is approximately is less than or equal to 12 millimeters. In various embodiments, the shape, length, and width of waveguide 202 may be any combination of shape, length and width configurations and sizes.

In some embodiments, waveguide 202 is attached to receiver chamber 222 of receiver 214. For example as shown, receiver 214 is recessed in receiver chamber 222 area that is included/attached to the side of waveguide 202. Waveguide 202 and receiver chamber 222 may be composed of the same or different materials. Examples of the materials include a food grade polymer, plastic, rubber, stainless steel, and other metals. In some embodiments, waveguide 202 is not attached to receiver chamber 222. For example, receiver chamber 222 is attached to the housing of sensor 200 and not directly attached to waveguide 202.

In some embodiments, a placement distance (e.g., vertical distance) between transmitter 204 and receiver 214 is at least 0.6 millimeters. For example, by vertically offsetting the transmitter 204 and receiver 214, signal coupling between transmitter 204 and receiver 214 through materials of sensor 200 is reduced and allows better detection of a desired reflected signal received by receiver 214. In some embodiments, at least a portion of transmitter 204 horizontally overlaps receiver 214 in the horizontal position. For example, due to their vertical offset, transmitter 204 is able to horizontally overlap receiver 214 (e.g., at least a portion of width of transmitter 204 overlaps at least a portion of width of receiver 214). In some embodiments, the signal output opening of waveguide 202 is substantially on the same vertical location as the opening of receiver chamber 222. For example, by placing the signal output opening of waveguide 202 on the same vertical location as the opening of receiver chamber 222, an effect of a signal reflection caused by the impedance mismatch of the output opening of waveguide 202 on the detection of a desired received reflected signal is minimized. In some embodiments, the signal output opening of waveguide 202 is parallel to the opening of receiver chamber 222.

In some embodiments, because debris, liquid, and other materials may enter the chamber of waveguide 202 and receiver chamber 222 (e.g., when using spout 208 to pour out contents of the container), the chamber of waveguide 202 and receiver chamber 222 are protected (e.g., to protect transmitter 204 and receiver 214). In some embodiments, a protective layer material covers the output opening of waveguide 202 and the opening of receiver chamber 222. Ideally the protective material must not allow undesired material through to the chambers while at the same time allowing signals (e.g., acoustic signals) to pass through. Protective material 216 covers the output opening of waveguide 202 and is attached to the opening edges of waveguide 202. Protective material 218 covers the output opening of receiver chamber 222 and is attached to the opening edges of receiver chamber 222. In some embodiments, protective material 216 and protective material 218 are the same continuous material. For example, a single connected sheet includes both protective material 216 and protective material 218. In some embodiments, protective material 216 and protective material 218 are not continuous materials. For example, in order to maximize decoupling of the transmitted signal of transmitter 204 and the received signal of receiver 214, protective material 216 and protective material 218 are not made of the same continuous material. In some embodiments, protective material 216 and protective material 218 are different materials. Examples of protective material 216 and protective material 218 include one or more of the following: mylar sheet, waterproof mesh, acoustic sheet, Teflon, Gortek and any other appropriate mesh or membrane. For example, a mylar sheet covering does not allow liquid to pass through while acting like a drum to allow acoustic signals to pass through. In some embodiments, protective material 216 and/or protective material 218 are acoustically transmissive liquid blocking materials. In some embodiments, protective material 216 and/or protective material 218 are optional.

In an alternative embodiment, rather than utilizing a separate transmitter and a separate receiver, a transceiver that acts as both a receiver and transmitter is utilized. For example, receiver 214 is not utilized and transmitter 204 is a transceiver (e.g., piezoelectric transceiver).

Figure 3A:
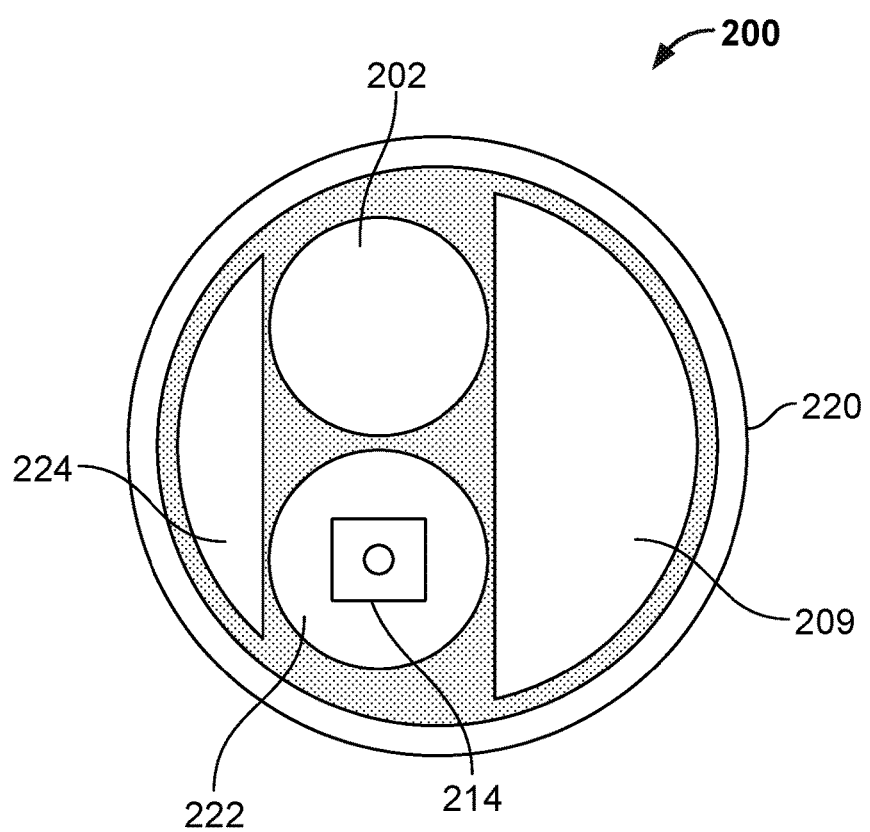
FIGS. 3A-3B are bottom view diagrams illustrating embodiments of a fill level sensor.
Figure 3B:
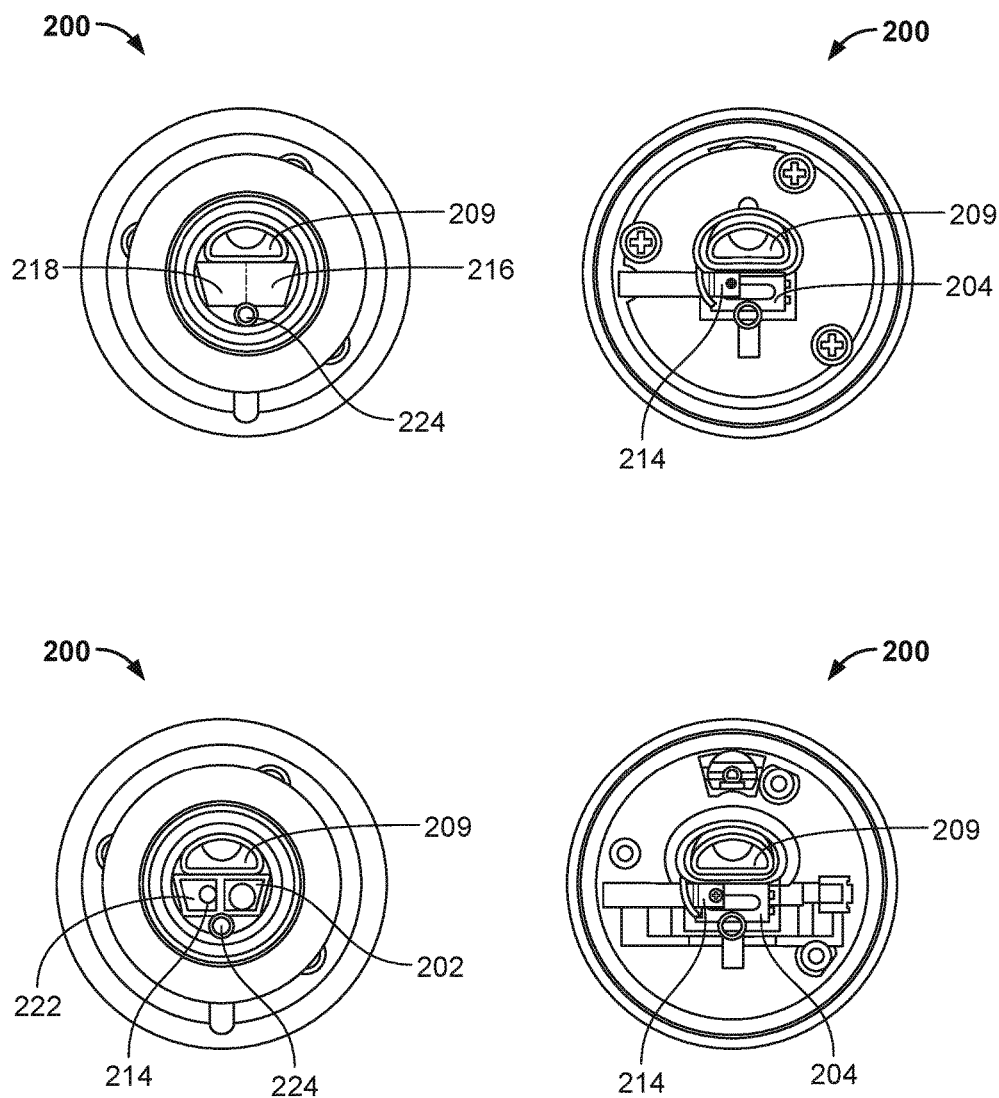

FIGS. 3A-3B are bottom view diagrams illustrating embodiments of a fill level sensor. Sensor 200 is sensor 200 of FIG. 2A or 2B. Sensor 200 includes flexible ridges 220 (e.g., rubber rings) that allows sensor 200 to be coupled to and seal an opening of a container (e.g., as shown in FIG. 1 and FIG. 2A). Spout input opening 209 allows contents (e.g., liquid contents of a container capped by sensor 200) that enter through spout input opening 209 to be channeled and outputted through spout 208 (shown in FIG. 2A). The signal output end of waveguide 202 is shown in FIGS. 3A and 3B. Receiver 214 is recessed inside receiver chamber 222. In some embodiments, protective material 216 covers the shown output opening of waveguide 202 and is attached to the shown opening edges of waveguide 202. In some embodiments, protective material 218 covers the shown output opening of receiver chamber 222 and is attached to the shown opening edges of receiver chamber 222. Vent output opening 224 (e.g., opening of a vent pipe) allows air to enter a container capped by sensor 200 as contents of the container is poured out through spout input opening 209. In order to show the internal components of various embodiments of sensor 200, one or more components of sensor 200 are not shown in FIGS. 3A-3B.

Figure 4A:
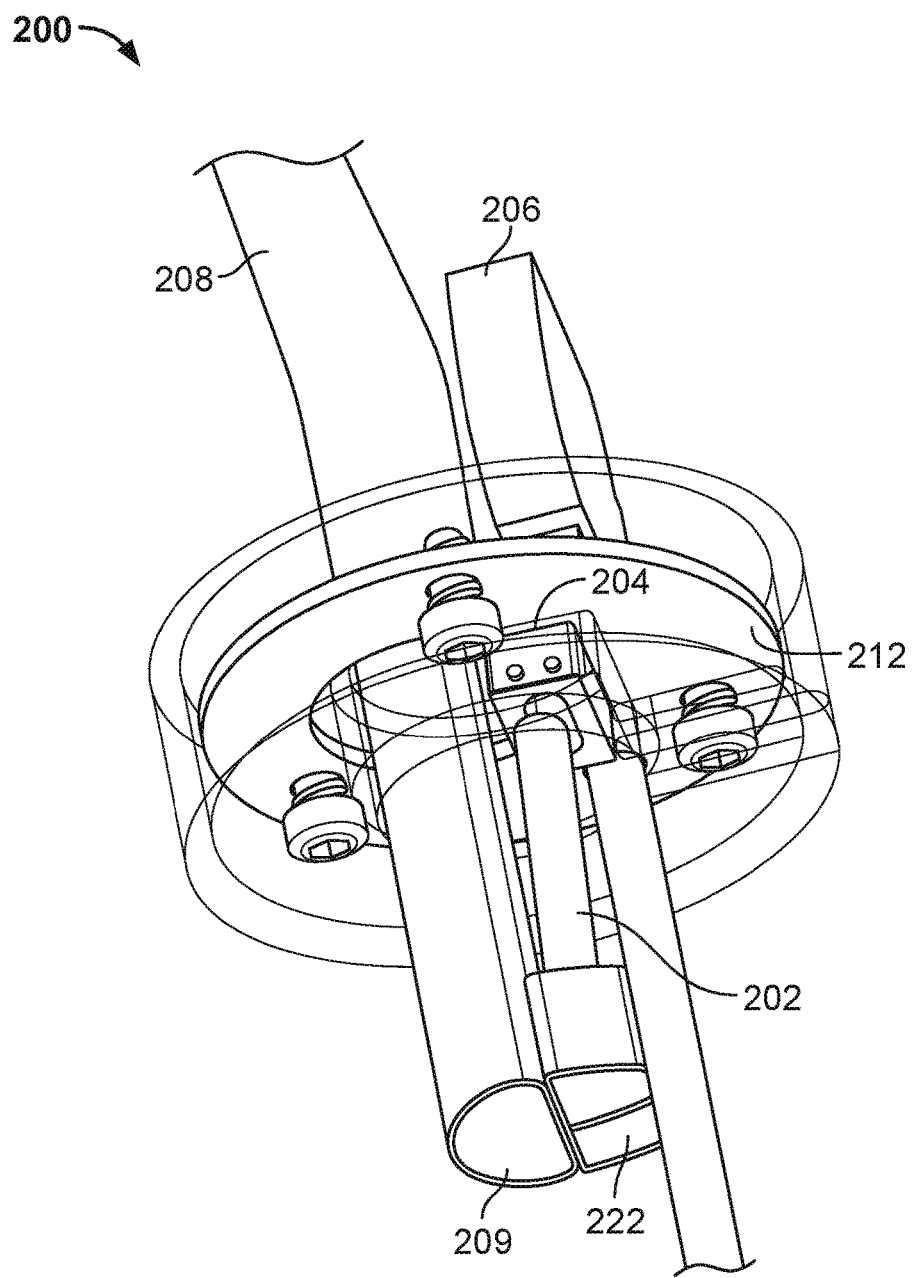
FIGS. 4A-4C are profile diagrams illustrating embodiments of a fill level sensor.
Figure 4B:
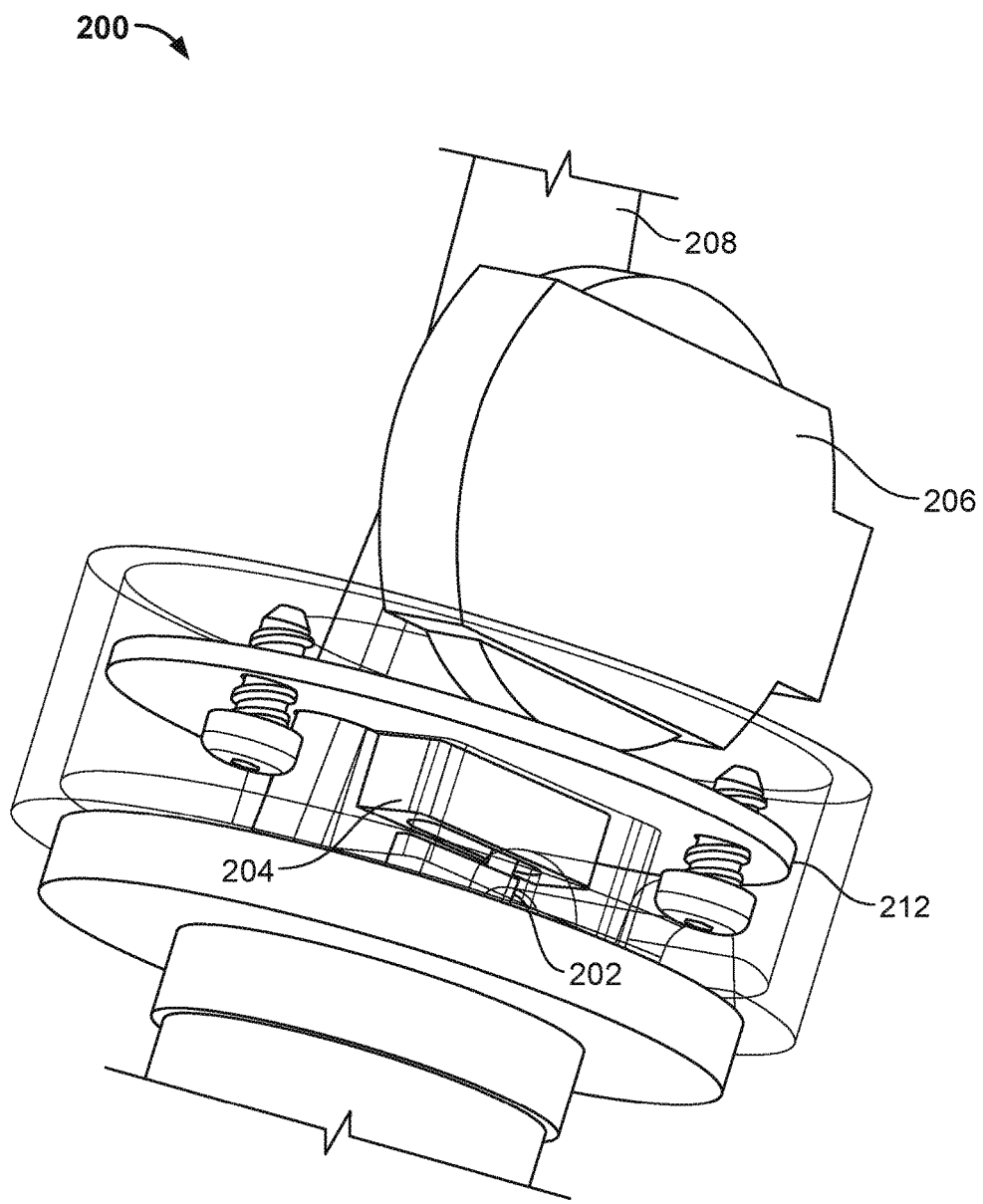
Figure 4C:
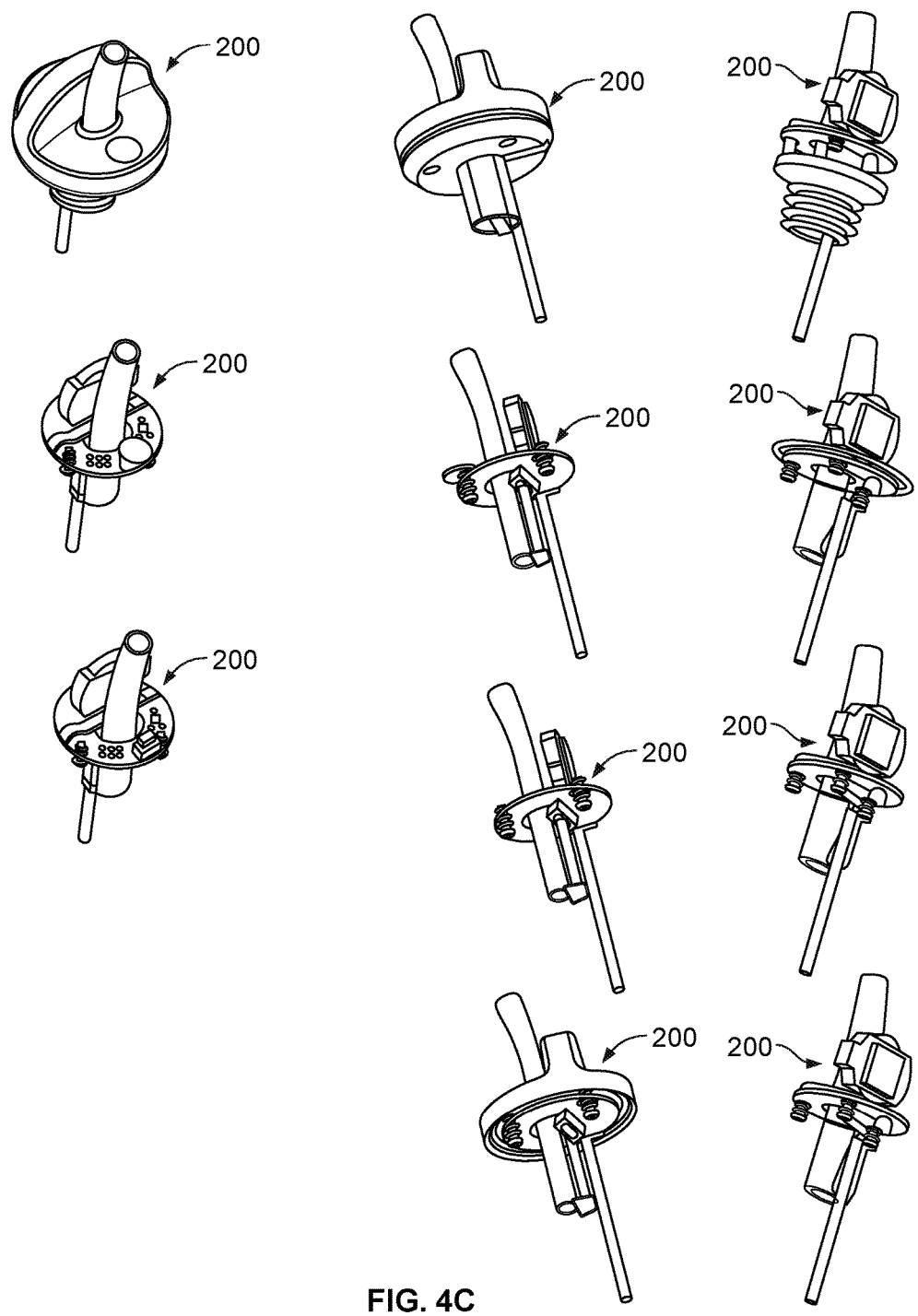

FIGS. 4A-4C are profile diagrams illustrating embodiments of a fill level sensor. The diagrams show various external and internal components of various embodiments of fill level sensor 200. In order to show the internal components of various embodiments of sensor 200, one or more components of sensor 200 are not shown in FIGS. 4A-4C.

Figure 5:
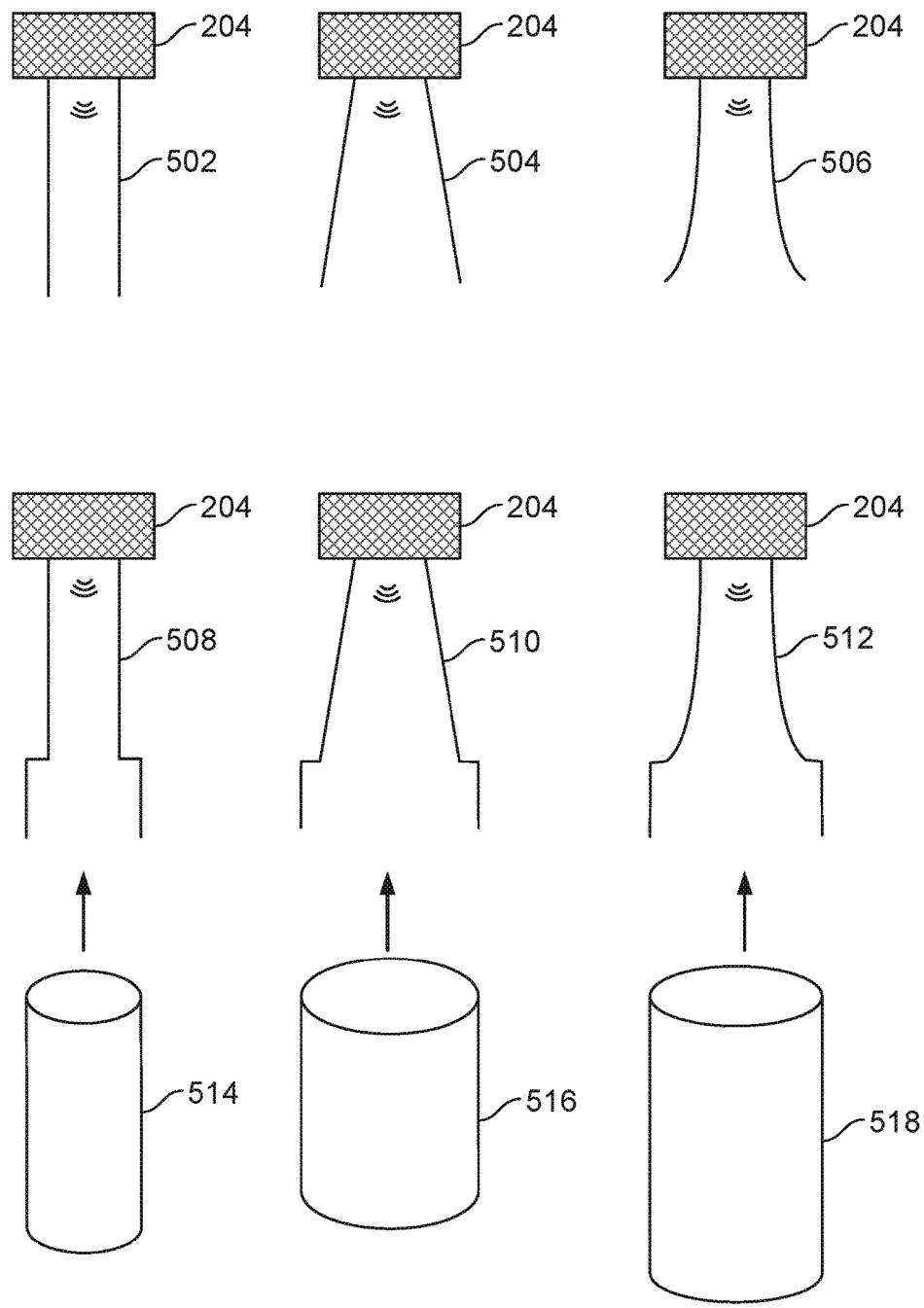
FIG. 5 is a diagram showing alternative embodiments of a waveguide.

FIG. 5 is a diagram showing alternative embodiments of a waveguide. In some embodiments, FIG. 5 shows alternative shapes of waveguide 202 shown in FIGS. 2, 3 and 4A.

Waveguides 502-512 show vertical cross-sectional diagrams of different embodiments of waveguide shapes. For example, although waveguides 502-512 are tubular in shape, the cross-sectional diagrams are shown to illustrate the hollow interior of the waveguides. Waveguide 502 includes substantially straight side walls that extend straight from the signal input end of waveguide 502 that receives signal input from transmitter 204 to the signal output end of waveguide 502. Waveguide 504 includes linearly sloped side walls that extend smoothly outward from signal input end of waveguide 504 that receives signal input from transmitter 204 to the signal output end of waveguide 504. Waveguide 506 includes exponentially sloped side walls that extend smoothly outward from the signal input end of waveguide 506 that receives signal input from transmitter 204 to the signal output end of waveguide 506.

In some embodiments, the output end of a waveguide is configured to accommodate a waveguide extension tube (e.g., tube with two open ends). For example, for certain types of containers, it may be beneficial to guide a signal outputted by transmitter 204 further down in to the container to measure fill level. By utilizing a waveguide extension tube, a waveguide is able to extend beyond the sensor 200. By extending the waveguide further down the container, undesired reflection in the container may be minimized. In some embodiments, the output end of the waveguide is enlarged to accommodate coupling with a waveguide extension tube. For example, in order to minimize the impedance mismatch between the output end of a waveguide with the input end of the waveguide extension tube to be coupled, the transition between the interior output opening of the sensor waveguide and interior input opening of the extension tube must be smooth. In some embodiments, the interior opening widths of waveguide extension tubes 514, 516 and 518 are substantially similar to interior opening widths of waveguides 508, 510, and 512, respectively.

Waveguide extension tubes 514, 516 and 518 are shown in profile view. Although waveguide extension tubes 514, 516 and 518 are shown separated from waveguides 508, 510, and 512, respectively, to show the different components, waveguide extension tubes 514, 516 and 518 may be inserted into waveguides 508, 510, and 512, respectively, to be coupled (e.g., friction coupling, mechanical coupling, etc.) together. To accommodate for the thickness of the waveguide extension tube, waveguides 508, 510, and 512 include bell shaped ends that can be coupled with waveguide extension tubes 514, 516, and 518, respectively to create a relatively smooth transition between the interior walls of the sensor waveguides and the waveguide extension tubes. In some embodiments, a waveguide extension tube is removable from a sensor waveguide. In some embodiments, a waveguide extension tube is permanently coupled (e.g., glued) to a sensor waveguide. Examples of the materials that make up waveguide extension tubes 514, 516, and 518 include a food grade polymer, plastic, rubber, stainless steel, and other metals.

Figure 6:
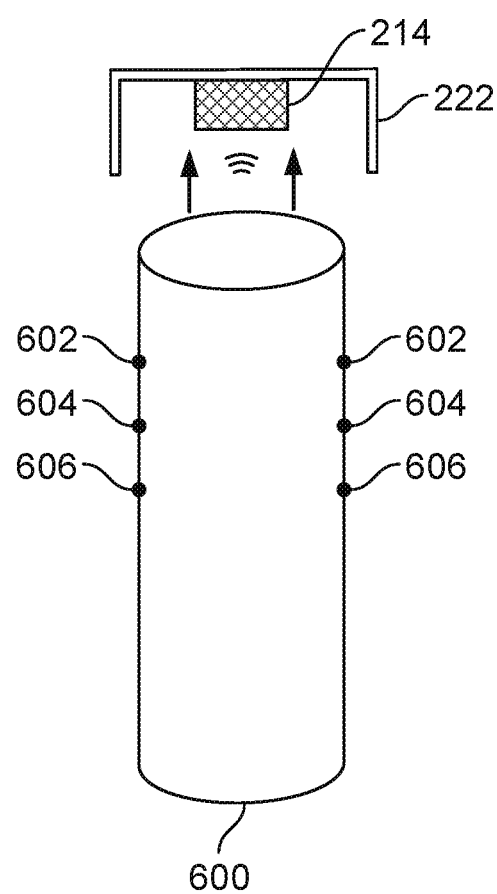
FIG. 6 is a diagram showing a receiver extension tube.

FIG. 6 is a diagram showing a receiver extension tube. In some embodiments, FIG. 6 shows an embodiment of receiver 214 and receiver chamber 222 of sensor 200 shown in FIGS. 2 and 3. Receiver 214 and receiver chamber 222 are shown in cross sectional view and receiver extension tube 600 is shown in profile view. Although receiver extension tube 600 is shown separated from receiver chamber 222 to show the different components, receiver extension tube 600 may be inserted into receiver chamber 222 to be coupled together. By utilizing a receiver extension tube, a receiver chamber is able to extend beyond the sensor 200.

In some embodiments, the output end of receiver chamber 222 is configured to accommodate receiver extension tube 600 (e.g., tube with at least two open ends). For example, for certain types of containers, it may be beneficial to receive a signal outputted by transmitter 204 further down in to the container within receiver extension tube 600. By extending further down the container the receiver chamber that will guide a received signal to receiver 214, undesired reflection in the container may be rejected from entering the extended receiver chamber. Receiver chamber 222 is configured to accommodate coupling (e.g., friction coupling, mechanical coupling, etc.) with receiver extension tube 600. The size of receiver chamber 222 is large enough to accommodate for the thickness of receiver extension tube 600. In some embodiments, a receiver extension tube is removable from receiver chamber 222. In some embodiments, receiver extension tube 600 is permanently coupled (e.g., glued) to receiver chamber 222. In some embodiments, at least one end of receiver extension tube 600 is sealed with an acoustically transmissive liquid blocking material (e.g., material 218 of FIG. 2A of FIG. 3B). The lengths, widths, and/or shape of receiver extension tube 600 may vary across different embodiments. Examples of the materials that make up receiver extension tube 600 include a food grade polymer, plastic, rubber, stainless steel, and other metals. In some embodiments, the interior opening width of receiver extension tube 600 is at least as large as a size of an opening of receiver 214 that is configured to receive a signal.

In the example shown, receiver extension tube 600 includes optional pairs of holes/slots 602, 604, and 606. Each hole of each pair is on the same horizontal axis position (e.g., vertical position) substantially opposite one another on receiver extension tube 600. Although three pairs have been shown, any number of pairs may exist in other embodiments. In some embodiments, pairs of holes/slots 602, 604, and 606 allow receiver 214 to act as a shotgun/parabolic microphone. For example, receiver 214 is able to directionally better detect signals received at the bottom of receiver extension tube 600 rather than the sides of extension tube 600. Signals received at the sides of receiver extension tube 600 (e.g., received through holes/slots 602, 604, and 606) may be largely cancelled out (e.g., signal waves are cancelled as signal is received through each opposite hole/slot of each hole/slot pair). In some embodiments, pairs of holes/slots 602, 604, and 606 are sealed with an acoustically transmissive liquid blocking material (e.g., material 218 of FIG. 2A and FIG. 3B).

Figure 7A:
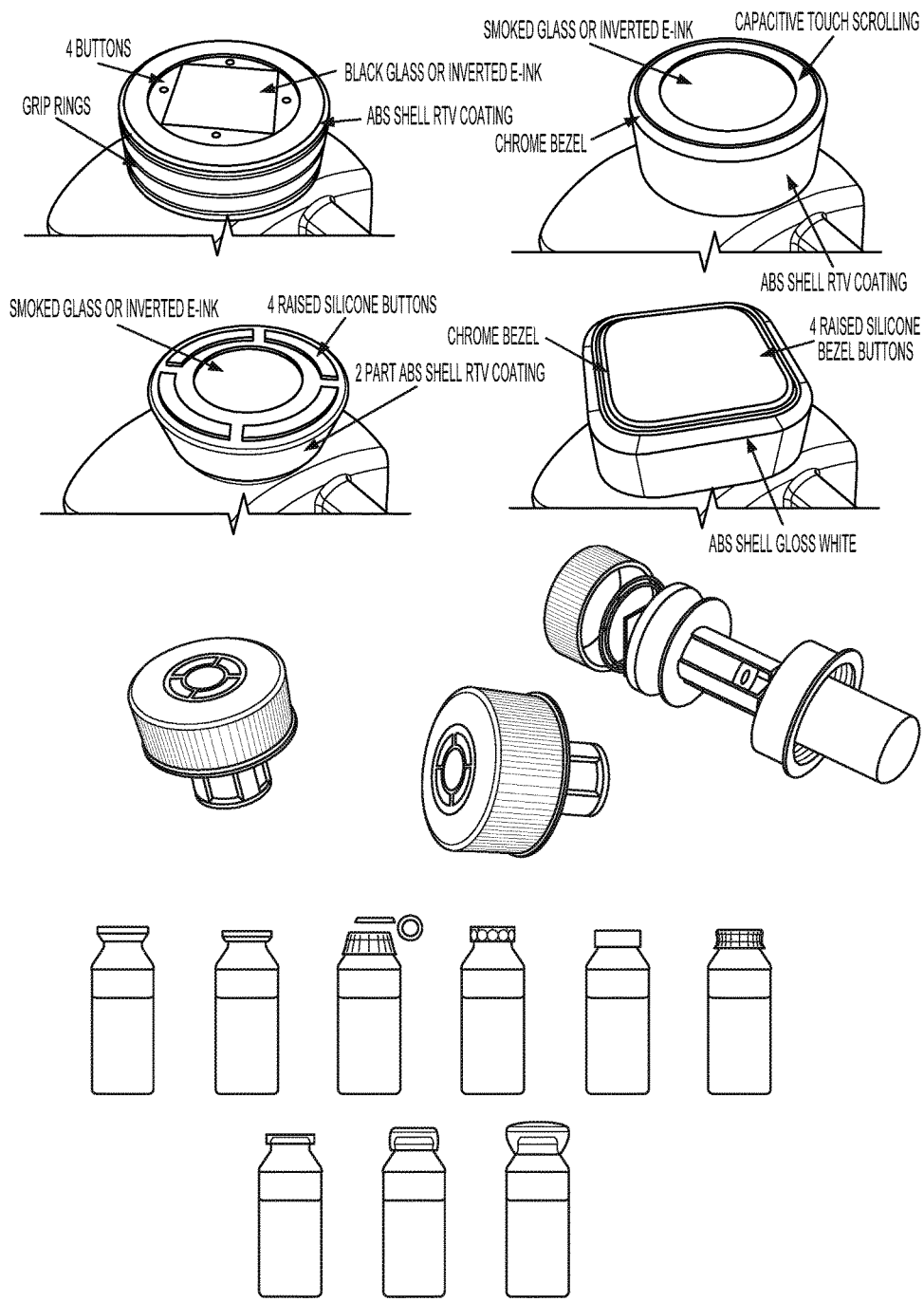
FIGS. 7A-7C show various container covers that may be similarly configured to include one or more of the components shown in other figures.
Figure 7B:
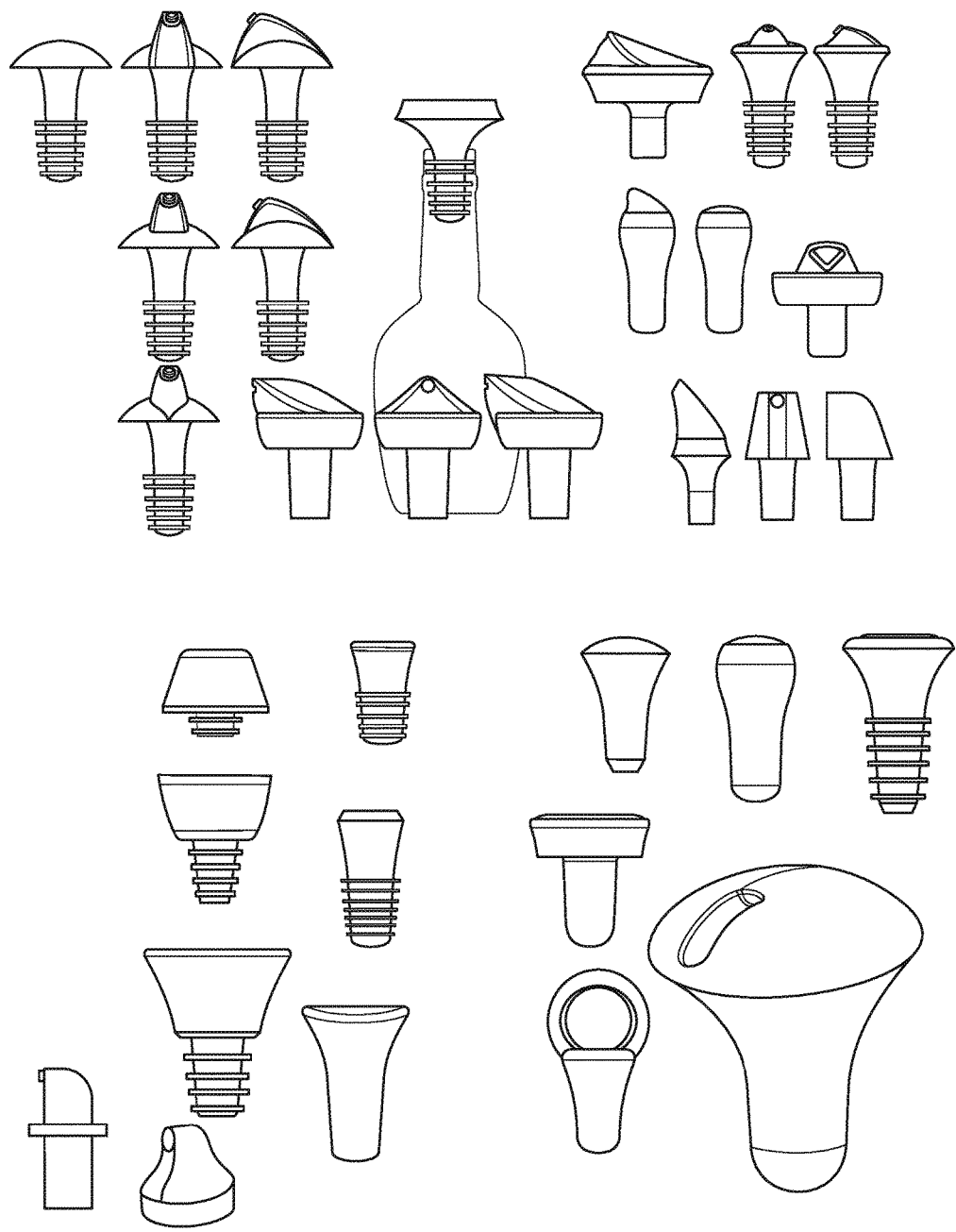
Figure 7C:
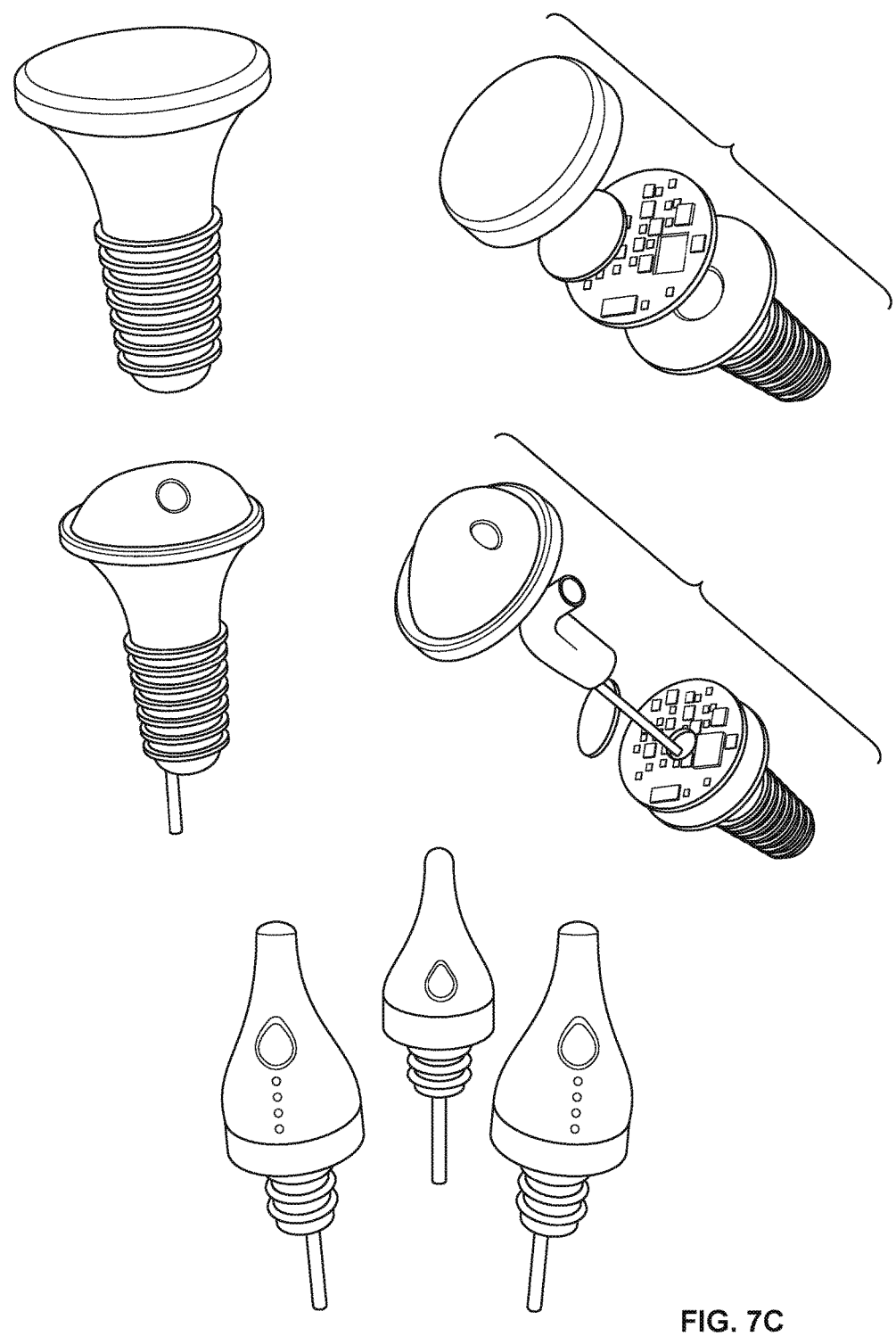

The example container cap shape of fill level sensors (e.g., sensor 200) shown in the Figures are merely illustrative. One or more of the internal components shown in FIGS. 2-6 may be configured and included similarly in different types of container covers/caps. FIGS. 7A-7C show various container covers that may be similarly configured to include one or more of the components shown in other figures.

The examples shown in the figures do not necessarily show every component of the embodiments shown. The figures have been simplified to illustrate the embodiments clearly. Other components not shown may be included in the embodiments. Any of the components shown in the figures may be optional. The figures have not been drawn to absolute and/or relative scale. The components shown may be of any relative or absolute dimension.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A content fill level sensor, including:
   a transmitter located in a container cover that is configured to engage an opening of a container, wherein the transmitter is included in a first enclosed space that is at least in part enclosed by a first acoustically transmissive material portion;
   a waveguide extending from the transmitter such that the waveguide includes a distal end that is configured to be located within an interior of the container when the container cover engages the container, wherein the waveguide includes a chamber that extends from the transmitter to the distal end and the waveguide is configured to guide an ultrasonic sound signal emitted by the transmitter down the chamber and exit out of the chamber towards a surface of a fill content included in the container;
   a receiver located in the container cover that is configured to engage the opening of the container and the receiver is configured to receive the signal emitted by the transmitter and reflected within the container, wherein the receiver is separate from the transmitter, the receiver is included in a second enclosed space different from the first enclosed space, and the second enclosed space is at least in part enclosed by a second acoustically transmissive material portion;
   an accelerometer included in the content fill level sensor;
   a data storage included in the content fill level sensor; and
   a processor included in the content fill level sensor, wherein the processor is configured to analyze a filtered version of the signal received by the receiver.

2. The sensor of claim 1, wherein the filtered version of the signal was obtained using a band-pass filter.

3. The sensor of claim 1, wherein the transmitter is an acoustic signal transmitter and the receiver is an acoustic signal receiver.

4. The sensor of claim 1, wherein the processor is configured to analyze the filtered version of the signal to determine an amount of time between the emission of the signal by the transmitter and the receipt of the signal by the receiver.

5. The sensor of claim 1, wherein the receiver is configured to receive the signal via a receiver extension tube.

6. The sensor of claim 1, wherein the content fill level sensor is configured to measure a liquid fill level of the container.

7. The sensor of claim 1, analyzing the filtered version of the signal received by the receiver includes ignoring a predetermined beginning portion of the signal.

8. The sensor of claim 1, wherein the transmitter is a transceiver.

9. The sensor of claim 1, wherein the chamber is hollow.

10. The sensor of claim 1, further comprising a spout.

11. The sensor of claim 1, wherein the first acoustically transmissive material portion blocks the fill content from entering the first enclosed space but allows the signal emitted by the transmitter to at least in part pass through the first acoustically transmissive material portion, and the first acoustically transmissive material portion and the transmitter are separated by an air gap.

12. The sensor of claim 1, wherein the first acoustically transmissive material portion is at least in part made of a mylar material.

13. The sensor of claim 1, wherein the waveguide is configured to accommodate coupling with a waveguide extension tube.

14. The sensor of claim 1, wherein an interior chamber wall of the waveguide is substantially smooth.

15. The sensor of claim 1, wherein the chamber of the waveguide is filled with an acoustically permeable material.

16. The sensor of claim 1, wherein an interior chamber wall of the waveguide is coated with an acoustic signal dampening material.

17. The sensor of claim 1, wherein a horizontal cross-sectional area of the chamber of the waveguide is generally increasing from a proximal end of the waveguide closest to the transmitter to the distal end.

18. The sensor of claim 1, wherein a shape of a first opening of a proximal end of the waveguide closest to the transmitter is different than a shape of a second opening at the distal end.

19. The sensor of claim 1, further comprising a wireless data communication signal transmitter configured to transmit an identifier of a container fill level.

20. The sensor of claim 1, wherein the content fill level sensor is included in a bottle stopper.

* * * * *